United States Patent [19]

Diamantoglou

[11] Patent Number: 5,093,488
[45] Date of Patent: Mar. 3, 1992

[54] MODIFIED CHITIN FOR BIOCOMPATIBLE DIALYSIS MEMBRANES III AND PROCESS FOR PREPARATION OF MODIFIED CELLULOSE AND MODIFIED CHITIN FOR USE THEREWITH

[75] Inventor: Michael Diamantoglou, Erlenbach, Fed. Rep. of Germany

[73] Assignee: Akzo N.V., Netherlands

[21] Appl. No.: 599,821

[22] Filed: Oct. 19, 1990

Related U.S. Application Data

[62] Division of Ser. No. 316,336, Feb. 27, 1989, Pat. No. 4,997,935.

[30] Foreign Application Priority Data

Feb. 25, 1988 [DE] Fed. Rep. of Germany ....... 3805966

[51] Int. Cl.$^5$ .................. C08B 37/08; C08B 1/02; C08B 3/16; C08B 11/02

[52] U.S. Cl. .................. 536/124; 536/20; 536/30; 536/32; 536/33; 536/34; 536/43; 536/44; 536/56; 536/58; 536/59; 536/62; 536/63; 536/64; 536/65; 536/66; 536/67; 536/68; 536/69; 536/84; 536/90; 536/91; 536/92; 536/93; 536/95; 536/96; 536/98; 536/100; 536/101

[58] Field of Search .......... 536/20, 30, 32, 33, 536/34, 43, 44, 56, 58, 59, 62-69, 84, 90-93, 95-101, 124

[56] References Cited

U.S. PATENT DOCUMENTS

| | | |
|---|---|---|
| 1,991,107 | 2/1935 | Malm et al. .......... 536/33 |
| 2,131,120 | 9/1938 | Schlack .......... 8/189 |
| 2,136,299 | 11/1938 | Haskins .......... 536/22 |
| 2,430,911 | 11/1947 | Charch et al. .......... 536/66 |
| 2,453,275 | 11/1948 | Seymour et al. .......... 536/59 |
| 2,759,925 | 8/1956 | Hiatt et al. .......... 260/225 |
| 2,856,399 | 10/1958 | Mench et al. .......... 260/224 |
| 3,314,940 | 4/1967 | Lemmerling et al. .......... 536/59 |
| 3,489,743 | 1/1970 | Crane .......... 536/64 |
| 3,505,312 | 4/1970 | Malon et al. .......... 260/325 |
| 3,745,202 | 7/1973 | Riggleman et al. .......... 264/41 |
| 3,816,150 | 6/1974 | Ishii et al. .......... 106/194 |
| 4,278,790 | 7/1981 | McCormick .......... 536/84 |
| 4,487,926 | 12/1984 | Ishikawa et al. .......... 536/82 |
| 4,520,192 | 5/1985 | Namikoshi .......... 536/66 |
| 4,590,265 | 5/1986 | Bogan et al. .......... 536/63 |
| 4,708,951 | 11/1987 | Inagaki et al. .......... 514/57 |
| 4,872,983 | 10/1989 | Dimantoglou et al. . |
| 4,958,011 | 9/1990 | Bade .......... 536/20 |

FOREIGN PATENT DOCUMENTS

| | | |
|---|---|---|
| 1129605 | 9/1982 | Canada .......... 536/20 |
| 0028126 | 5/1981 | European Pat. Off. . |
| 0172437 | 2/1986 | European Pat. Off. . |
| 1720087 | 6/1971 | Fed. Rep. of Germany . |
| 2300496 | 7/1973 | Fed. Rep. of Germany . |
| 2705735 | 5/1982 | Fed. Rep. of Germany . |
| 3246417 | 6/1984 | Fed. Rep. of Germany . |
| 3312922 | 10/1984 | Fed. Rep. of Germany . |
| 3410133 | 10/1985 | Fed. Rep. of Germany . |
| 3524596 | 1/1987 | Fed. Rep. of Germany . |
| 3602402 | 7/1987 | Fed. Rep. of Germany ........ 536/20 |
| 3723897 | 1/1989 | Fed. Rep. of Germany . |
| 210288 | of 1974 | German Democratic Rep. . |
| 60203265 | 3/1984 | Japan . |
| 1-167302 | 7/1989 | Japan .......... 536/20 |

OTHER PUBLICATIONS

Abstract Bulletin of the Institute of Paper Chemistry vol. 37, No. 12, 1967, p. 750, No. 8820.
134 Carbohydrate Research 305-312 (1984).
24 Kidney International 764-769 (1983).
7 Asaio-Journal 44-49 (1984).
Chemical Abstract: vol. 74, 1971, p. 105, Ref. 65813g.
Chemical Abstract: vol. 98, 1983, p. 345, Ref. 22307f.
Chemical Abstract: vol. 102, 1985 p. 62, Ref. 167988g.
Chemical Abstract: vol. 103, 1985, p. 120, Ref. 8399c.
Chemical Abstract: vol. 107, 1987, p. 95, Ref. 98428w.
Chemical Abstract: vol. 107, 1987, p. 110, Ref. 79805a.
48 Chem. Engineering News 66-67 (1970).
Jp 61 212302 A. In: Patent Abstracts of Japan, Sect. C, vol. 11, 1987, No. 47, (C-403).

Primary Examiner—Thurman K. Page
Assistant Examiner—Carlos Azpuru
Attorney, Agent, or Firm—Oliff & Berridge

[57] ABSTRACT

A modified cellulose and/or chitin for biocompatible dialysis membranes having a structure represented by the formula

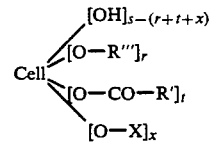

wherein cell is cellulose or chitin, in each case without hydroxyl groups, $s=3$ in the case of cellulose and $s=2$ in the case of chitin, $R'$ is $CH_3$ and/or $C_2H_5$ and/or $C_3H_7$, X denotes specified functional groups, $R''$ is H or R, $R'''$ denotes R, $x+t=0.75$ to 2.85, $t=0$ to 2.85, $x=0$ to 2.85, and $r=0$ to 1. A process for preparation of the cellulose and/or chitin derivatives is also disclosed.

6 Claims, No Drawings

MODIFIED CHITIN FOR BIOCOMPATIBLE DIALYSIS MEMBRANES III AND PROCESS FOR PREPARATION OF MODIFIED CELLULOSE AND MODIFIED CHITIN FOR USE THEREWITH

This is a division of application Ser. No. 07/316,336 filed Feb. 27, 1989, now U.S. Pat. No. 4,997,935.

TECHNICAL FIELD

The invention relates to cellulose and/or chitin derivatives which are suitable for the manufacture of biocompatible dialysis membranes.

BACKGROUND

U.S. Pat. No. 4,278,790 discloses cellulose solutions using lithium chloride and dimethyl acetamide as solvent. The solutions can contain up to 8% of lithium chloride and up to about 3% of cellulose. It is also possible to prepare cellulose derivatives in these cellulose solutions. According to this patent, the solutions are prepared by introducing cellulose into a mixture of dimethyl acetamide and lithium chloride and initially heating the mixture at about 150° C. for an extended period. Subsequently, the solution which has then formed is cooled to room temperature, while stirring.

In addition, German Offenlegungsschrift 3,312,022 and German Offenlegungsschrift 3,246,417 disclose cellulose ester filaments which are insoluble in water. They have an extremely high adsorptive capacity for water and physiological fluids. This may be an advantage for some areas of use but for many it is a disadvantage.

The cellulose acetate phthalates known from U.S. Pat. Nos. 2,759,925, 2,856,399 and 3,505,312 have high phthaloyl content and in salt form are water-soluble and therefore unsuitable as membrane materials. If the products are not in the salt form, they are insoluble in water and accordingly are also insoluble in the solvents which contain the usual hydrophilic additives and which are usual for membrane formation.

U.S. Pat. No. 3,745,202 and West German Offenlegungsschrift 2,300,496 describe processes for preparation of asymmetric membranes of cellulose derivatives having ester and/or ether groups.

U.S. Pat. No. 4,590,265 describes the products formed by oxidation of cellulose esters with ozone. The cellulose products synthesized by oxidation of cellulose or cellulose derivatives always had poor biocompatibility regardless of the oxidizing agent.

German Patent 2,705,735 discloses a dialysis membrane for hemodialysis, having antithrombogenic compounds chemically bonded thereto, the dialysis membrane consisting of two or more layers of a cellulose regenerated from cuprammonium cellulose solution, each of which has been obtained from separately fed orifices of a spinneret, which cellulose contains chemically bonded substances having antithrombogenic activity.

Japanese Patent Application 60-203,265 describes high molecular weight cellulose products for the preparation of medical instruments with anticoagulant properties. Such products are mixtures of polycationic and polyanionic cellulose derivatives, and are usually obtained by mixing appropriate polymer solutions. Such water-insoluble salts are unsuitable as membrane materials, since the danger is always present that they will be transformed by salt-interchange effects into a compound which is water-soluble or which swells greatly in water.

However, it has also been proposed in German Offenlegungsschrift 1,720,087 that by reacting the polymeric material of the membrane with an alkyl halide and then reacting the resulting material with an alkali metal salt of an antithrombogenic compound having a cationic residue (for example, heparin or a heparinoid compound) the risk of blood coagulation is diminished. The possible alkyl halides in this context also include haloalkyldialkylamines. Cellulose, and most importantly cellulose acetate, are among the possible polymers.

An antithrombogenic effect of these known dialysis membranes is observed only when the degree of substitution of the modified cellulose is high, i.e., greater than at least 0.1, and a preheparinization with a relatively high heparin concentration (0.1 to 1% by weight solution) is carried out in a separate stage.

German Offenlegungsschrift 3,524,596 discloses a dialysis membrane with improved biocompatibility, which is distinguished in that the mean degree of substitution of a modified cellulose is 0.02 to 0.07. The known dialysis membrane composed of modified cellulose preferably contains such a modified cellulose which has a structure represented by the formula cellulose—R'—X—Y where 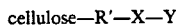
X represents —NR"— and/or $NR_2$— and/or —S— and/or —SO— and/or —$SO_2$— and/or —CO—NR— and/or —CO—O— and/or —O—, Y represents —R and/or —$NR_2$ and/or —Si(OR")$_3$ and/or —$SO_3H$ and/or —COOH and/or —$PO_3H_2$ and/or $NHR_2$ and the salts thereof, R' represents an alkylene group and/or cycloalkylene group and/or arylene group having a total of 1 to 25 C atoms, R" represents a hydrogen atom or R, and R represents an alkyl group having 1 to 5 C atoms and/or a cycloalkyl group and/or aryl group.

This known dialysis membrane is capable of reducing to a considerable extent blood coagulation, leukopenia and complement activation. However, no noteworthy extent of adsorption of beta-2-microglobulin has been achieved.

German Patent Application P 3,723,897.3 describes cellulose derivatives having the general formula

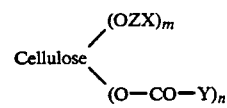

in which

—Z— denotes an alkylene, alkenylene, alkynylene, cycloalkylene or benzylene or xylylene radical which may or may not be substituted, X denotes —H, —$NR_2$, $NR_3$, —CN, —COOH, —$SO_3H$, —PO(OR)$_2$, —$CONR_2$ or —Si(OR)$_3$, where R denotes a hydrogen atom or an alkyl or alkenyl group having 1 to 25 C atoms, or a cycloalkyl, toluyl or phenyl group, and Y is an alkyl, alkenyl or alkynyl group, which may or may not be substituted, having 1 to 36 C atoms, a cycloalkyl group or a phenyl, toluyl or benzyl group or a

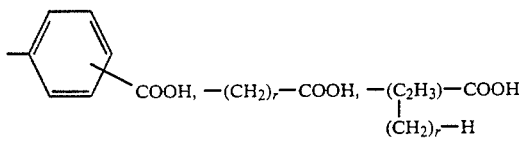

or (—CH=CH—COOH) or NH—R radical and R has the same meaning, and r = 1–20,
m = 0–2.5,
n = 0.2 to 2.95, with the proviso that, where m = 0, n ≧ 1.55 when Y is an alkyl radical having 1-5 C atoms, a —(CH$_2$)$_r$—COOH radical with r = 0, 1 or 2 or a radical of phthalic acid, and the degree of polymerization is more than 400, and which can be prepared by homogeneous reaction in a mixture of dimethyl acetamide and/or N-methylpyrrolidone with LiCl after activation of the cellulose starting material without the presence of LiCl, the preparation thereof and the use thereof for membranes and filaments.

Apart from the circumstance that dialysis membranes composed of synthetic or natural polymers can, when used in artificial kidneys, very easily induce blood coagulation, which is substantially prevented by appropriate drug treatment, in the case of dialysis membranes composed of regenerated cellulose there is frequently a transient fall in leukocytes in the first period of dialysis treatment when a kidney patient is treated with dialyzers having cellulose membranes. This effect is called leukopenia. Leukopenia is a reduction in the number of leukocytes (white blood corpuscles) in the circulating blood. The number of white blood corpuscles in humans is about 4,000 to 12,000 cells/mm$^3$.

Leukopenia associated with dialysis is most pronounced 15 to 20 min after the start, it being possible for the neutrophils (which are the leukocytes which can be stained with neutral or simultaneously with acidic and basic dyes) to disappear almost completely. Subsequently, the number of leukocytes recovers again within about one hour to almost the initial level or exceeds it.

If, after the leukocytes have recovered, a new dialyzer is connected, leukopenia occurs again to the same extent Cellulose membranes cause pronounced leukopenia. Even though the clinical significance of leukopenia has not been scientifically eludicated, there is nevertheless a desire for a dialysis membrane for hemodialysis which does not exhibit the leukopenic effect, without this adversely affecting the other very desired properties of dialysis membranes composed of regenerated cellulose.

During hemodialysis using membranes composed of regenerated cellulose, beside the leukopenia there has also been found a distinct complement activation. The complement system within the blood serum is a complex plasma-enzyme system which consists of many components and acts in various ways to prevent damage due to invading foreign cells (bacterial etc.). When antibodies against the invading organism are present, there can be complement-specific activation by the complex of the antibodies with antigenic structures of the foreign cells, otherwise complement activation takes place by an alternative pathway due to special surface features of the foreign cells. The complement system is based on a multiplicity of plasma proteins. After activation, these proteins react specifically in a defined sequence with one another and, finally, a cell-damaging complex which destroys the foreign cell is formed.

Individual components release peptides which induce inflammatory manifestations and occasionally can also have undesired pathological consequences for the organism. It is assumed that in the case of hemodialysis membranes composed of regenerated cellulose the activation takes place by the alternative pathway. These complement activations are detected objectively by determination of the complement fragments C3a and C5a.

In this context, reference is made to the following studies: D. E. Chenoweth et al., 24 *Kidney International* pages 746 et seq. (1983) and D. E. Chenoweth, 7 *Asaio-Journal* pages 44 et seq. (1984).

The carpal tunnel syndrome is affected by modified cellulose derivatives. Yet, there is a considerable need for further modifications of the cellulose in order to eliminate this phenomenon too as completely as possible An object of the present invention is to provide modified cellulose and/or chitin which, in terms of leukopenia, complement activation and blood coagulation, confers optimum properties on membranes and furthermore, is able to adsorb to a considerable extent the beta-2-microglobulin which is responsible for the carpal tunnel effect.

SUMMARY OF THE INVENTION

In one aspect, the present invention relates to a modified cellulose and/or chitin, wherein the modified cellulose and/or chitin has a structure represented by the formula

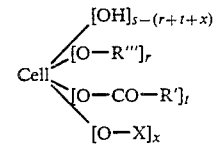

wherein

Cell is the framework of an unmodified cellulose molecule or of a chitin molecule, in each case without hydroxyl groups;

s = 3 in the case of the unmodified cellulose molecule and s = 2 in the case of the chitin molecule;

R' is at least one member selected from the group consisting of CH$_3$, C$_2$H$_5$ and C$_3$H$_7$;

X is at least one member selected from the group consisting of CO—R, CS—R, CO—CR'$_2$—CO—CHR"$_2$, CO—OR, CONH—R, CONR"R, CSNH—R, CSNR"R, SO$_2$—R, SO$_2$NR"R, SO—R, SONR"R, PO$_3$H$_2$, a salt of PO$_3$H$_2$, PO$_2$R"R, POR"$_2$, PO(OR")$_2$, CR"$_2$—CR"(OH)—R, CR"$_2$—CR"(SH)—R, CR"$_2$—NHR, R—COOH, a salt of R—COOH, R—SO$_3$H, a salt of R—SO$_3$H, R, CH$_2$—CH$_2$—NR"$_2$, and CH$_2$—CH$_2$—SO$_2$—R;

R is selected from the group consisting of alkyl, alkenyl alkynyl, each of which is straight-chain or branched, unsubstituted, substituted by D, or interrupted by a member selected from the group consisting of O, S, N, P, Si, CO—, and COO—groups, cycloalkyl which is unsubstituted, substituted by D, or is interrupted by a heteroatom selected from the group consisting of O, S, N, P and Si, arylalkyl, arylalkenyl, arylalkynyl, each of which is unsubstituted, substituted by D, or is interrupted by at least one heteroatom selected from the group consisting of O, S, N, P and Si, a bisaryl radical which is unsubstituted or substituted by D, a radical of a condensed aromatic compound which is unsubstituted or substituted by D, a radical of a heterocyclic compound which is unsubstituted or substituted by D, and aryl;

D is a member selected from the group consisting of R, —NR″$_2$, NR‴$_3$, —COOH, a salt of —COOH, —COOR″, —CONR″$_2$, —CO—R″, —CSOH, a salt of —CSOH, —CSOR″, —CSNR″$_2$, —SO$_3$H, a salt of —SO$_3$H, —SO$_3$R″, —SO$_2$NR″$_2$, SR″, —SOR″, —SONR″$_2$, PO$_3$H$_2$, a salt of —PO$_3$H, —PO$_3$H$_2$—PO(OR″)$_2$, —PO$_2$H(NR″$_2$), —PO(NR″$_2$)$_2$, —PO$_2$H$_2$, —OR″, halogen, and —Si(OR″)$_3$;

R″ is H or R;
R‴ denotes R;
x+t=0.75 to 2.85;
t=0 to 2.85;
x=0 to 2.85;
r=0 to 1.

The present invention also relates to a process for preparation of a modified cellulose and/or chitin wherein at least one member of the group consisting of cellulose, cellulose ether, chitin, and chitin ether are reacted with at least one member selected from the group consisting of acid chlorides, acid anhydrides, acids, esters, ketenes, diketenes, chloroformic acid esters, carbonic acid diesters, 2.5-diketooxazolidines, isatinic anhydride, isocyanates, carbamoyl chlorides, thiocyanates, thiocarbamoyl chlorides, sulfonyl chlorides, sulfonic acid anhydrides, N-chlorosulfonamides, sulfinic acid chlorides, N-chlorosulfinamides, phosphoric acid anhydride, phosphonic acid anhydrides, phosphonic acid chlorides, phosphorous acid, phosphinic acid anhydrides, ethylene oxide, ethylene sulfide, ethyleneimino, lactone, sultone, cleavable onium compounds, alkylaminoethanol sulfate esters, and alkylsulfonethanol sulfate esters.

DETAILED DESCRIPTION OF THE PREFERRED EMBODIMENTS

As summarized above, the objects of the invention are achieved by a modified cellulose and/or chitin, wherein the modified cellulose and/or chitin has a structure represented by the formula

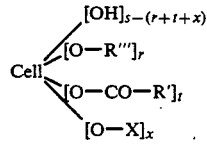

wherein
Cell is a framework of an unmodified cellulose molecule or of a chitin molecule, in each case without hydroxyl groups, s = 3 in the case of the unmodified cellulose molecule and s=2 in the case of the chitin molecule;

R' is CH$_3$ and/or C$_2$H$_5$ and/or C$_3$H$_7$;

X is CO—R and/or CS—R and/or CO—CR′$_2$—CO—CHR″$_2$ and/or CO—OR and/or CONH—R and/or CONR″R and/or CSNH—R and/or CSNR″R and/or SO$_2$—R and/or SO$_2$NR″R and/or SO—R and/or SONR″R and/or PO$_3$H$_2$ or a salt thereof and/or PO$_2$R″R and/or POR″$_2$ and/or PO(OR″)$_2$ and/or CR″$_2$—CR″(OH)—R and/or CR″$_2$—CR″(SH)—R and/or CR″$_2$—CR″$_2$—NHR and/or R—COOH of a salt thereof and/or R—SO$_3$H or a salt thereof and/or R and/or CH$_2$—CH$_2$—NR″$_2$ and/or CH$_2$—CH$_2$—SO$_2$—R;

R is an alkyl and/or alkenyl and/or alkynyl (straight-chain and/or branched, which may or may not be substituted, the carbon chain also being able to be interrupted by heteroatoms such as O, S, N, P or Si as well as by CO— or COO—groups) and/or cycloalkyl (which may or may not contain heteroatoms and/or may or may not be substituted) and/or aryl and/or arylalkyl and/or arylalkenyl and/or arylalkynyl (which may or may not contain heteroatoms and/or may or may not be substituted) and/or bisaryl radical (which may or may not be substituted) and/or radical of a condensed aromatic compound (which may or may not be substituted) and/or radical of a heterocyclic compound (which may or may not be substituted);

By "substituted", there are meant, in addition to radicals in the sense of R, also the following groups:

—NR″$_2$, and/or N̄R″$_3$, and/or —COOH or a salt thereof, and/or —COOR″, and/or —CONR″$_2$, and/or —CO—R″, and/or —CSOH or a salt thereof, and/or —CSOR″, and/or —CSNR″$_2$, and/or —SO$_3$H or a salt thereof, and/or —SO$_3$R″, and/or —SO$_2$NR″$_2$, and/or —SR″, and/or —SOR″, and/or —SONR″$_2$, and/or —PO$_3$H$_2$ or a salt thereof, and/or —PO(OR″)$_2$, and/or —PO$_2$H(NR″$_2$), and/or —PO(NR″$_2$)$_2$, and/or —PO$_2$H$_2$, and/or —POH(OR″), and/or —CN, and/or —NO$_2$, and/or —OR″, and/or halogen, and/or —Si(OR″)$_3$;

R″ is H or R;
R‴ denotes R;
x+t=0.75 to 2.85;
t=0 to 2.85;
x=0 to 2.85;
r=0 to 1.

Preferably the degree of polymerization is 100 to 500, especially 150 to 350.

When x+t1.10 to 2.35, modified cellulose are obtained which are characterized by exhibiting a pronounced reduction of the C5a activation.

Preferably r=0.05 to 0.60.

The subject matter of the invention, is also a process for preparation of the modified celluloses and/or chitin-saccording to the invention, wherein cellulose, and/or cellulose ether and/or chitin and/or chitin ether are reacted with acid chlorides and/or acid anhydrides and/or acids and/or esters and/or ketenes and/or diketenes and/or chloroformic acid esters and/or carbonic acid diesters and/or 2.5-diketooxazolidines and/or isatinic anhydrid and/or isocyanates and/or carbamoyl chlorides and/or thiocyanates and/or thiocarbamoyl chlorides and/or sulfonyl chlorides and/or sulfonic acid anhydrides and/or N-chlorosulfonamides and/or sulfinic acid chlorides and/or N-chlorosulfinamides and/or phosphoric acid anhydride and/or phosphonic acid anhydrides and/or phosphonic acid chlorides and/or phosphorous acid and/or phosphinic acid anhydrides and/or ethylene oxide and/or ethylene sulfide and/or ethyleneimino and/or lactone and/or sultone and/or cleavable onium compounds and/or alkylaminoethanol sulfate esters and/or alkylsulfonethanol sulfate esters.

The complement activation within the scope of the present invention was assessed on the basis of the C5a fragments. For this purpose, 300 ml of heparinized blood plasma was recirculated in vitro through a dialyzer with an effective exchange area of 1 m$^2$ at a plasma flow rate of 100 ml/min for a period of 4 hours. The C5a fragments in the plasma were determined using the RIA method (Upjohn assay). The relative complement activation for the particular time of measurement was calculated as a percentage by forming the ratio of the concentration at the time of sampling with the initial value. The measurement after a recirculation time of 4 hours was used for the evaluation. Flat membranes were incubated with heparinized blood plasma for 3 hours and then the C5a fragments were determined.

The increase in the beta-2-microglobulin level in longterm dialysis patients is observed after use of membranes composed of regenerated cellulose and is attributed to these membranes being less permeable to substances in the molecular weight range 1,000 to 20,000 and the microglobulins thus being removed to an insufficient extent during the dialysis. Beta-2-microglobulin is not adsorbed to a noteworthy extent onto customary membranes composed of regenerated cellulose. However, the cellulose derivatives according to the invention can contribute in an unexpected manner to this.

The beta-2-microglobulin content adsorbed onto the membrane is measured within the scope of the invention in the following manner.

10 ml of human blood plasma are added to each 500 mg of substance (dialysis membrane) and incubated at 37° C. for 30 minutes. The human blood plasma contains 13.67 mg/liter of beta-2-microglobulin. The sample is centrifuged at 3,000 r.p.m. for 15 minutes. The beta-2-microglobulin content in the supernatant is determined. The sample is then washed 2 times with 10 ml of phosphate-buffered saline each time. The microglobulin content in the washings is also determined. The percentage amount of beta-2-microglobulin adsorbed can be calculated from the difference between the original and the unabsorbed beta-2-microglobulin.

The average degree of polymerization DP was determined in a cupriethylenediamine solution by the DIN 54270 method.

The degree of etherification and/or degree of esterification were determined on the basis of the analytical results which are known and typical for the substituents, for example nitrogen by the Kjeldahl method, sulfur by the Schoniger method or phosphorus by the molybdate method, where appropriate from the difference between before and after saponification.

EXAMPLES

The Examples set forth below illustrate the practice and advantages of the present invention. As Examples, they are illustrative only, and should not be construed to limit the allowable scope of protection available to the Applicant in any way whatsoever.

EXAMPLE 1

35.36 g (0.2 mole) of diethylaminoethylcellulose (DS=0.15) were suspended in a mixture of 300 ml of methylene chloride, 40.4 g (0.64 mole) of acetic acid and 112.3 g (1.1 mole) of acetic anhydride in a 1 liter three-necked flask. Thereafter 3.62 g (0.036 mole) of perchloric acid dissolved in 10 g (0.16 mole) of acetic acid were slowly added dropwise. In the process, the temperature rose to 45° C. After 1.5 hours a clear viscous solution was formed. After addition of 3.92 g (0.04 mole) of potassium acetate, the methylene chloride was distilled off, and the reaction product was precipitated and washed with methanol and dried in a vacuum oven at 60° C. This procedure yielded 52.5 g of a diethylaminoethylcellulose acetate having the following specifications:
Content of acetyl groups:t=2.3
Content of diethylaminoethyl groups:r=0.13
Degree of polymerization:DP=270

47 g of this diethylaminoethyl-0.13-cellulose-2.3-acetate were dissolved in 360 g of formic acid. The solution was diluted with 50 g of water and 70 of PEG 400, filtered, deaerated and spun to capillary membranes. These had the following properties:
Wall thickness:10 μm
Internal diameter:200 μm
Ultrafiltration rate:6.3 ml/h·m²·mm Hg at 37° C.
Vitamin B12 permeability:$6.5 \times 10^{-3}$ cm/min at 37° C.

The reduction in C5a compared with the unmodified cellulose membrane is 98%.

EXAMPLES 2–26

On the basis of the procedure of Example 1, the polysaccharide derivatives listed in Tables 1 and 2 were prepared and processed by known methods to flat membranes, and their complement activation was determined on the basis of the C5a fragments.

EXAMPLE 27

On the basis of the procedure of Example 1, chitin was acetylated and the resulting product having a total acetyl-group content of DS=2.05 was reacted with phenyl isocyanate to obtain a phenylcarbamate derivative. 49.63 g (0.2 mole) of the acetylated chitin were suspended in 500 ml of toluene in a 1 liter three-necked flask. 11.90 g (0.10 mole) of phenyl isocyanate and 15.80 g (0.20 mole) of pyridine (catalyst) were added to the mixture. To complete the reaction, the mixture was heated under reflux for 48 hours. The reaction product was filtered off, washed with cold and hot methanol and dried in a vacuum oven at 60° C. This procedure yielded a phenylcarbamatechitin derivative having the following specifications:
Content of acetyl groups:t=2.05
Content of phenylcarbamate groups:x=0.15

For the membranes prepared from chitin compound, the reduction in C5a compared with the unmodified cellulose is 98%.

TABLE 1

| | (polysaccharide framework = cellulose) | | | | | | |
|---|---|---|---|---|---|---|---|
| Example No. | R''' | r | R' | t | X | x | % C5a red. |
| 2 | $C_2H_4-N(C_2H_5)_2$ | 0.33 | $CH_3$ | 2.26 | — | 0 | 93 |
| 3 | $C_2H_4-N(C_2H_5)_2$ | 0.17 | $CH_3$ | 1.95 | $C_2H_5CO$ | 0.30 | 99 |
| 4 | $C_2H_4-N(C_2H_5)_2$ | 0.11 | $CH_3$ | 2.10 | $C_{17}H_{35}CO$ | 0.05 | 90 |
| 5 | $C_2H_4-N(C_2H_5)_2$ | 0.08 | $CH_3$ | 2.25 | $C_{11}H_{23}CH=C(CH_2COOH)-CO$ | 0.06 | 95 |
| 6 | $C_2H_4-N(C_2H_5)_2$ | 0.15 | $CH_3$ | 2.15 | $C_6H_5-NHCO$ | 0.13 | 100 |
| 7 | $CH_2-COOH$ | 0.09 | $CH_3$ | 2.30 | — | 0 | 85 |
| 8 | $CH_2-COOH$ | 0.07 | $CH_3$ | 2.25 | $C_6H_4(COOH)-CO$ | 0.06 | 94 |

TABLE 1-continued (polysaccharide framework = cellulose)

| Example No. | R''' | r | R' | t | X | x | % C5a red. |
|---|---|---|---|---|---|---|---|
| 9 | $C_2H_4$—$SO_3H$ | 0.11 | $CH_3$ | 2.05 | — | 0 | 89 |
| 10 | $C_2H_4$—$SO_3H$ | 0.10 | $CH_3$ | 2.22 | HOOC—$CH_2$—$CH_2$—CO | 0.12 | 97 |
| 11 | $C_2H_4$—$PO_3H$ | 0.05 | $CH_3$ | 2.18 | — | 0 | 86 |
| 12 | $C_2H_4$—$PO_3H$ | 0.07 | $CH_3$ | 1.85 | $C_2H_5CO$ | 0.25 | 92 |
| 13 | $C_{18}H_{37}$ | 0.05 | $C_3H_7$ | 2.30 | — | 0 | 80 |
| 14 | $C_2H_4SO_2C_{18}H_{37}$ | 0.08 | $CH_3$ | 2.23 | — | 0 | 77 |
| 15 | $CH_2CH(OH)C_{10}H_{21}$ | 0.10 | $CH_3$ | 2.27 | — | 0 | 79 |
| 16 | $CH_2CH(OH)CH_2OOCC_{17}H_{35}$ | 0.06 | $CH_3$ | 2.20 | — | 0 | 75 |
| 17 | $C_3H_6COOH$ | 0.10 | $CH_3$ | 2.28 | — | 0 | 82 |
| 18 | $CH(COOH)_2$ | 0.07 | $CH_3$ | 2.03 | HOOC—CH=CH—CO | 0.08 | 98 |
| 19 | $C_6H_5$—$CH_2$ | 0.10 | $C_2H_5$ | 2.25 | — | 0 | 72 |
| 20 | — | 0 | $CH_3$ | 2.25 | $C_{15}H_{31}CH=C(CH_2COOH)CO$ | 0.07 | 96 |
| 21 | — | 0 | $CH_3$ | 2.30 | $HOOCCH(SO_3H)CH_2CO$ | 0.09 | 98 |

TABLE 2

(polysaccharide framework = chitin)

| Example No. | R''' | r | R' | t | X | x | % C5a red. |
|---|---|---|---|---|---|---|---|
| 22 | $C_2H_4$—$N(C_2H_5)_2$ | 0.12 | $CH_3$ | 0.95 | — | 0 | 95 |
| 23 | $C_2H_4$—$N(C_2H_5)_2$ | 0.12 | $CH_3$ | 0.90 | $C_{17}H_{33}CO$ | 0.05 | 97 |
| 24 | $CH_2$—COOH | 0.08 | $CH_3$ | 1.00 | — | 0 | 81 |
| 25 | — | 0 | $CH_3$ | 0.95 | $C_{11}H_{23}CH=C(CH_2COOH)CO$ | 0.10 | 93 |
| 26 | — | 0 | $CH_3$ | 0.95 | $HOOCC_6H_4CO$ | 0.20 | 95 |

What is claimed is:

1. A modified chitin, wherein the modified chitin has a structure represented by the formula

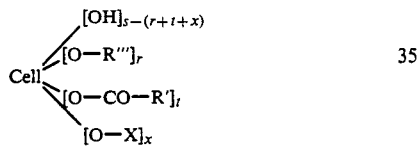

wherein
Cell is the framework of a chitin molecule, without hydroxyl groups;
s=2;
R' is at least one member selected from the group consisting of $CH_3$, $C_2H_5$ and $C_3H_7$;
x is at least one member selected from the group consisting of CO—R, CS—R, CO—CR'$_2$—CO—CHR''$_2$, CO—OR, CONG—R, CONR''R, CSNH—R, CSNR''R, $SO_2$—R, $SO_2NR''R$, —SO—R, SONR''R, $PO_3H_2$, a salt of $PO_3H_2$, $PO_2R''R$, RPOR''$_2PO(OR'')_2$, CR''$_2$—CR''(OH)—R, CR''$_2$—CR(SH)—CR'$_2$—CR''$_2$—NHR, R—COOH, a salt of R—COOH, R—$SO_2H$, a salt of R—$SO_3H$, R, $CH_2$—$CH_2$—Nr''$_2$, and $CH_2CH_2$—$SO_2$—R;
R is selected from the group consisting of alkyl, alkenyl and alkynyl, each of which is straight-chain having a carbon chain length of rom 1 to 18 carbon atoms, unsubstituted, substituted by d, or interrupted by a member selected from the group consisting of O, S, N, P, Si, CO—, and COO—groups, cycloalky which is unsubstituted, substituted by d, or interrupted by a heteroatom selected from the group consisting of O, S, N, P and Si, arylalkyl, arylalkenyl, arylalkynyl, each of which is unsubstituted, substituted by D, or is interrupted by at least one heteroatom selected form the group consisting of O, S, N, P and Si, a bisaryl radical which is unsubstittued or subbstituted by D, a radical of a condensed aromatic compound which is unsubstituted or substituted by D, a radical of a heterocyclic compound which is unsubstituted or substituted by D, and aryl;
D is a member selected from the group consisting of R, —NR''$_2$, —$\overset{+}{N}R''_3$, —COOH, a salt of —COOH, COOR'', —CONR''$_2$, —CO—R'', —CSOH, a salt of —CSOH, —CSOR'', —CSNR''$_2$, —$SO_3H$, a salt of —$SO_2H$, —$SO_3R''$, —$SO_2NR''_2$, —SR'', —SOR'', —SONR''$_2$, —$PO_3H_2$, a salt of —$PO_3H_2$, —$PO(OR'')_2$, —$PO_2H(NR''_2)$, —$PO(NR''_2)_2$, —$PO_2H_2$, —POH(OR''), —CN, —$NO_2$, —OR'', halogen, and —$Si(OR'')_3$;
R'' is H or R;
R''' denotes R;
x+t=0.75 to 2.85;
t=0 to 2.85;
x=0 to 2.85;
r=0 to 1

2. A modified chitin as claimed in claim 1, wherein the degree of polymerization is 100 to 500.

3. A modified chitin as claimed in claim 2, wherein the degree of polymerization is 150 to 350.

4. A modified chitin as claimed in claim 1, wherein x+t=1.10 to 2.35.

5. A modified chitin as claimed in claim 1, wherein r=0.05 to 0.60.

6. A process for preparation of at least one compound selected from the group consisting of a modified cellulose and chitin wherein said modified cellulose and chitin have a structure represented by the formula

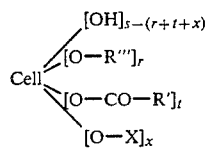

wherein
Cell is the framework of an unmodified cellulose molecule or of a chitin molecule, in each case without hydroxyl groups;
$s=3$ in the case of the unmodified cellulose molecule and
$s=2$ in the case of the chitin molecule;
R' is at least one member selected from the group consisting of $CH_3$, $C_2H_5$, and $C_3H_7$;
X is at least one member selected from the group consisting of CO—R, CS—R, CO—$CR''_2$, —CO—$CHR''_2$, CO—OR, CONH—R, CONR''R, CSNH—R, CSNR''R, $SO_2$—R, $SO_2NR''R$, SO—R, SONR''R, $PO_3H_2$, a salt of $PO_3H_2$, $PO_2R''R$, $POR''_2$, $PO(OR'')_2$, $CR''_2$—$CR''(OH)$—R, $CR''_2$—$CR''(SH)$—R, $CR''_2$—$CR'_2$—NHR, R—COOH, a salt of R—COOH, R—$SO_3H$, a salt of R—$SO_3H$, R, $CH_2CH_2NR''_2$, and $CH_2$—$CH_2$—$SO_2$—R; R is selected from the group consisting of alkyl, alkenyl and alkynyl, each of which is straight-chain having a carbon chain length of from 1 to 18 carbon atoms, unsubstituted, substituted by D, or interrupted by a member selected from the group consisting of O, S, N, P, Si, CO—, and COO—groups, cycloalkyl which is unsubstituted, substituted by D, or interrupted by a heteroatom selected from the group consisting of O, S, N, P, and Si, arylalkyl, arylalkenyl, arylalkynyl, each of which is unsubstituted, substituted by D, or is interrupted by at least one heteroatom selected from the group consisting of O, S, N, P, and Si, a bisaryl radical which is unsubstituted or substituted by D, a radical of a condensed aromatic compound which is unsubstituted or substituted by D, a radical of a heterocylic compound which is unsubstituted or substituted by D, and aryl;
D is a member selected from the group consisting of R, —$NR''_2$, $NR''_3^+$, —COOH or a salt thereof, —COOR'', —CSOR'', —$CONR''_2$, —CO—R'', —CSOH, or a salt of —CSOH, —CSOR'', —$CSNR''_2$, —$SO_3H$, —$SO_3R''$, —$SO_2NR''_2$, —SR'', —SOR'', —$SONR''_2$, —$PO_3H_2$, a salt of —$PO_3H_2$, —$PO(OR'')_2$, —$PO_2H(NR''_2)$, —$PO(NR''_2)_2$, —$PO_2H_2$, —$POH(OR'')$, —CN, —$NO_2$, —OR'', halogen, and —$Si(OR'')_3$;
R'' is H or R;
R''' denotes R;
$x+t=0.75$ to $2.85$;
$t=0$ to $2.85$;
$x=0$ to $2.85$;
$r=0$ to $1$,
comprising reacting at least one member of the group consisting of cellulose, cellulose ether, chitin, and chitin ether with at least one member selected from the group consisting of acid chlorides, acid anhydrides, acids, esters, ketenes, diketenes, chloroformic, acid esters, carbonic acid diesters, 2.5-diketooxazolidines, isatinic anhydride, isocyanates, carbamoyl chlorides, thiocyanates, thiocarbamoyl chlorides, sulfonyl chlorides, sulfonic acid anhydrides, N-chlorosulfonamides, sulfinic acid chlorides, N-chlorosulfinamides, phosphoric acid anhydride, phosphonic acid anhydrides, phosphonic acid chlorides, phosphorous acid, phosphinic acid anhydrides, ethylene oxide, ethylene sulfide, ethyleneimino, lactone, sultone, cleavable onium compounds alkylaminoethanol sulfate esters, and alkylsulfonethanol sulfate esters to form said compound, and isolating said compound.

* * * * *

UNITED STATES PATENT AND TRADEMARK OFFICE
CERTIFICATE OF CORRECTION

PATENT NO.   : 5,093,488
DATED        : March 3, 1992
INVENTOR(S)  : Michael DIAMANTOGLOU It is certified that error appears in the above-identified patent and that said Letters Patent is hereby corrected as shown below:

Col. 2,     line 31, change "-NR"- to -- -$\overset{+}{N}R$"- --;
change "NR$_2$-" to -- $\overset{+}{N}R_2$- --;

line 35, change "and/org" to --and/or--;

line 36, change "$\overset{+}{N}HR_2$" to -- -$\overset{+}{N}HR$"$_2$ --.

Col. 4,     line 20, after "possible" insert --.--;

line 57, change "CR"$_2$-NHR," to -- CR"$_2$-CR$_2$-NHR, --.

Col. 5,     line 9, change "NR"$_3$," to -- $\overset{+}{N}R$"$_3$, --;

line 13, change "-PO$_3$H" (first occurrence) to -- -PO$_3$H$_2$ --; delete "-PO$_3$H-" (second occurrence);

line 14, delete "$_2$";

line 15, after "-PO$_2$H$_2$," insert -- POH(OR"), -CN, -NO$_2$, --.

Col. 6,     line 46, change "saccording" to --according--.

line 52, change "anhydrid" to --anhydride--.

Col. 7,     line 12, change "longterm" to --long-term--.

UNITED STATES PATENT AND TRADEMARK OFFICE
CERTIFICATE OF CORRECTION

PATENT NO. : 5,093,488
DATED : March 3, 1992
INVENTOR(S) : Michael DIAMANTOGLOU

It is certified that error appears in the above-identified patent and that said Letters Patent is hereby corrected as shown below:

Claim 1, col. 9, line 48, change "CONG-R," to -- CONH-R, --;

line 51, change "RPOR"$_2$" to -- POR"$_2$, --;

line 52, change "CR"$_2$-CR(SH)" to --CR"$_2$-CR"(SH)-R, CR"--.

line 54, change "R-SO$_2$H," to -- R-SO$_3$H, --;

line 55, change "$_2$-Nr"$_2$," to -- $_2$-NR"$_2$, --;

line 58, change "rom" to --from--;

line 59, change "d," to --D,--;

line 62, change "d," to --D,--;

line 67, change "form" to --from-- col. 10, line 37, change "unsubstittued" to --unsubstituted--.

Signed and Sealed this

Seventeenth Day of August, 1993

Attest:

BRUCE LEHMAN

*Attesting Officer*  *Commissioner of Patents and Trademarks*